(12) United States Patent
Jurmu (10) Patent No.: US 6,247,196 B1
(45) Date of Patent: Jun. 19, 2001

(54) BOGIE CONSTRUCTION

(75) Inventor: Risto Jurmu, Pohjankuru (FI)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/350,900

(22) Filed: Jul. 12, 1999

(30) Foreign Application Priority Data

Jul. 10, 1998 (FI) ....................................................... 981593

(51) Int. Cl.⁷ .................................................... B60G 5/00
(52) U.S. Cl. .............................. 9/1; 280/81.6; 180/24.01; 180/24.02
(58) Field of Search ..................................... 280/100, 443, 280/444, 81.6, 682, 676; 180/449, 23, 24, 24.01, 24.02, 24.03

(56) References Cited

U.S. PATENT DOCUMENTS

| | | | |
|---|---|---|---|
| 3,608,923 | * 9/1971 | Houfek et al. | 280/682 |
| 4,964,480 | 10/1990 | Kopczynski. | |
| 5,255,754 | * 10/1993 | Lauronen | 180/24.01 |
| 5,492,351 | * 2/1996 | Salo | 180/24.01 |
| 6,135,484 | * 10/2000 | Lauronen et al. | 280/444 |

FOREIGN PATENT DOCUMENTS

| | | | |
|---|---|---|---|
| 2147696 | * 3/1973 | (DE) | 180/24.01 |
| 2 343 614 | 10/1977 | (FR). | |
| WO97/12771 | 4/1997 | (WO). | |
| WO97/24248 | 7/1997 | (WO). | |

* cited by examiner

*Primary Examiner*—Daniel G. DePumpo
(74) *Attorney, Agent, or Firm*—Burns, Doane, Swecker & Mathis, L.L.P.

(57) ABSTRACT

A bogie construction includes at least two stiff axles interconnected by a rocking lever. The rocking lever is pivoted in its middle so that it can move in its longitudinal direction as a result of steering movements. The rocking lever is preferably connected to the bogie axle that turns the least, by a joint of an ear, and thus this axle determines the longitudinal displacement of the rocking lever. The rocking lever is connected to the other axles which turn more by suspension rods. A suspension rod pivoted below the axle is used, and thus the suspension rod can be made as long as possible. Consequently, the suspension rod tilts less as a result of the longitudinal movement of the rocking lever.

9 Claims, 10 Drawing Sheets

BOGIE CONSTRUCTION

BACKGROUND OF THE INVENTION

The invention relates to a bogie construction particularly intended for specially heavy vehicles, such as mining vehicles, the bogie construction comprising at least two interconnected stiff axles, which form a bogie, at least some of the axles belonging to the bogie being turnable when the vehicle is steered with respect to a vertical pivoted axle mounted between the ends of the axles which are steerable with respect to the frame of the vehicle, and for interconnecting the axles belonging to the bogie. The bogie construction is provided with a rocking lever, which is arranged to turn with respect to the transverse axle of the vehicle between its ends and move in the longitudinal direction of the vehicle as a result of a steering movement of the axles in the bogie.

Stiff axles are commonly used in vehicles intended for especially heavy transports, such as heavy transport equipment, machinery, mining vehicles and the like. It is preferable to provide such vehicles with stiff axles because the loads are heavy. A structure of this kind is also simpler and thus more durable. Furthermore, the use of stiff axles is economically feasible. Usually there are more than two axles per vehicle in heavy vehicles, and axles are combined into bogie constructions using different levers and springs, which allows distribution of the load between several axles. In the case of axle constructions of specially heavy vehicles one also needs to consider the effect of the load carried by the vehicle, which may be arranged rather unevenly, and the effect of an uneven support (road) surface. Furthermore, since heavy vehicles typically also have large outer dimensions, i.e., they are long and wide, one usually needs to be able to steer more than one axle to be able to manage them easier. The turning radius can be reduced substantially if all axles are arranged to turn when the vehicle is steered.

Stiff axles which are turned during steering are typically combined with each other into a bogie construction using an equalizer lever or the like, usually by means of a rocking lever pivoted between its ends. Important design considerations include the fact that the wheels on the different sides of the vehicle move along turning circles with different radii when the vehicle is steered, and the additional fact that successive axles need to be able to turn by a different angle depending on their location in the longitudinal direction of the vehicle so that successive wheels could move along the same turning circle. In one prior art arrangement, the rocking lever interconnecting the axles is arranged to move in the longitudinal direction of the vehicle by pivoting it on a turning axle and by connecting it to other axles by various suspension rods and joints. There are also prior art proposals where the rocking lever is pivoted on the frame, and thus there are pivoted suspension rods mounted between the axles and the rocking lever, which allow the axles to move as required for steering. A disadvantage associated with the prior art structures is that a lot of space is required for the structure so that the levers can turn in the manner required for steering. A further problem is that steering causes the vehicle frame to move in the up and down direction, which requires considerable steering forces. Because the steering members have to lift the mass of the vehicle and the load carried by it when the vehicle turns, wheel suspension and steering members are loaded considerably.

An object of the present invention is to provide a new bogie construction for especially heavy vehicles, such as mining vehicles, which eliminates problems of the prior art.

SUMMARY OF THE INVENTION

The bogie construction of the invention is characterized in that the rocking lever which interconnects axles is pivoted by a joint located between its ends so that it can pivot with respect to the frame. The joint is arranged to move in the longitudinal direction of the frame so that it allows movement of the rocking lever in the longitudinal direction of the vehicle caused by steering of the axles. The first end of the rocking lever is connected to a first axle by means of a suspension rod. The first end of the first suspension rod is pivoted on the first end of the rocking lever and its second end is pivoted on the first axle. The second end of the rocking lever is pivoted by a joint on a second axle that is pivotably mounted to the joint. The second axle determines the displacement of the rocking lever in the longitudinal direction of the vehicle. The rocking lever is arranged to move substantially only in a horizontal direction during steering of the vehicle.

An essential idea of the invention is that two or more successive stiff axles are combined into a bogie construction by means of a rocking lever or several rocking levers, depending on the number of axles. The axles of the bogie are connected to a rocking lever by suspension rods or suitable ears, and the rocking lever is pivoted on the frame between its ends. Another essential feature of the invention is that the rocking lever is arranged to move in the longitudinal direction of the vehicle as required by steering so that the pivot point between its ends, around which the rocking lever is arranged to swing, is arranged to move in the longitudinal direction of the vehicle. The degree of displacement of the rocking lever in the longitudinal direction of the vehicle is preferably determined by the bogie axle that turns least. The rocking lever is pivoted on this axle by a joint, which allows movement of the ends of the rocking lever in the up and down direction, but the steering movement of the axle is transmitted to the rocking lever as its longitudinal movement. In that case the rocking lever is arranged to perform parallel transfer according to the steering movements. An essential idea of a preferred embodiment of the invention is that the rocking lever is pivoted on the free end of a supporting arm turnably pivoted with respect to the frame. An essential idea of another preferred embodiment of the invention is that the rocking lever between the axles is pivoted at least on the outermost axle below it, i.e., on the axle that turns most, using e.g., a curved C-shaped suspension rod and pivoted on the other axle with one joint. An idea of a third preferred embodiment is that the lower surfaces of at least some of the axles are provided with ears extending substantially downwards from the axles. The ear and naturally the suspension rod pivoted on the ear become longer, the further away the axle is from the longitudinal center of the vehicle. This arrangement allows to compensate for the different degrees of inclination of the suspension rods due to different turning angles. Furthermore, an essential idea of a fourth preferred embodiment of the invention is that the bogies formed by successive stiff axles are connected together on both sides of the vehicle by means of longitudinal equalizer levers. Thus the lever mechanism is arranged to distribute the loads directed to the bogies and their axles evenly in different loading and driving situations of the vehicle. Furthermore, the lever mechanisms on both sides of the frame may be connected by a transverse equalizer lever or by a corresponding arrangement which also allows rotational movement between the bogies.

An advantage of the invention is that steering of the axles does not cause significant vertical movement of the frame, and thus the loads directed to the lever mechanism and steering members will be smaller. Furthermore, the mechanical lever arrangement of the invention is simple and durable, and its features can be changed easily in various ways by changing spring stiffness, lever arms, joints, etc. A further advantage is that the levers of the bogie can be mounted in the structures of the vehicle better than in prior art solutions, which leaves more room for different actuators and components in the lower sections of the vehicle. An advantage of a suspension rod pivoted below the axle is that the suspension rod may be longer than would be the case if the suspension rod were pivoted above the axle. However, the need for space above the axles does not increase, since only part of the suspension rod extends above the upper surface of the axle. An advantage provided by the long suspension rod is that it tilts less than a short suspension rod as a result of the longitudinal movement of the rocking lever caused by a steering movement in extreme positions of steering. Thanks to the long suspension, rod there will be no significant vertical displacements between the ends of the rocking lever, i.e., the rocking lever does not tilt significantly with respect to pivoting provided substantially between its ends due to the steering movement. A further advantage provided by the long suspension rod which tilts slightly is that forces are directed to it more advantageously than to a strongly tilted suspension rod. Mainly press and tension is directed to a suspension rod which tilts slightly. Thus the suspension rod does not need to be as solid as in earlier cases, but a suspension rod with smaller outer dimensions and a lighter structure is also sufficient. Furthermore, it is possible to avoid the considerable horizontal force caused by a strongly tilting suspension rod, and thus steering levers, steering cylinders and other steering members do not need to be as heavy-structured as in earlier cases. Thanks to the pivoting being provided below the axle, the torques directed to the axle can be received without necessarily having to support the axle by additional supporting arms below or above the axle. Thus the axle is supported by a triangular support or the like substantially in its middle and by suspension rods at its ends. A further advantage of the lever mechanism mounted between axles according to the invention is that it allows the load, which consists of the mass of the vehicle and of the load carried by the vehicle and directed to the axles of the vehicle, to be distributed more evenly between the axles, and thus neither axles, nor springs and other components used for the supporting and suspension of axles, do not need to be as massive as in the prior art solutions. By means of the lever mechanism, loads can be distributed even when the vehicle travels on an uneven surface, and since all wheels are pressed firmly against the ground, the vehicle moves forward better. In addition, the lever mechanism of the invention enables greater oscillation between the bogies. All in all, the travel of the vehicle is smoother.

BRIEF DESCRIPTION OF THE DRAWINGS

The invention will be described in greater detail in the accompanying drawings, in which.

DETAILED DESCRIPTION OF PREFERRED EMBODIMENTS OF THE INVENTION

Figure 1A:
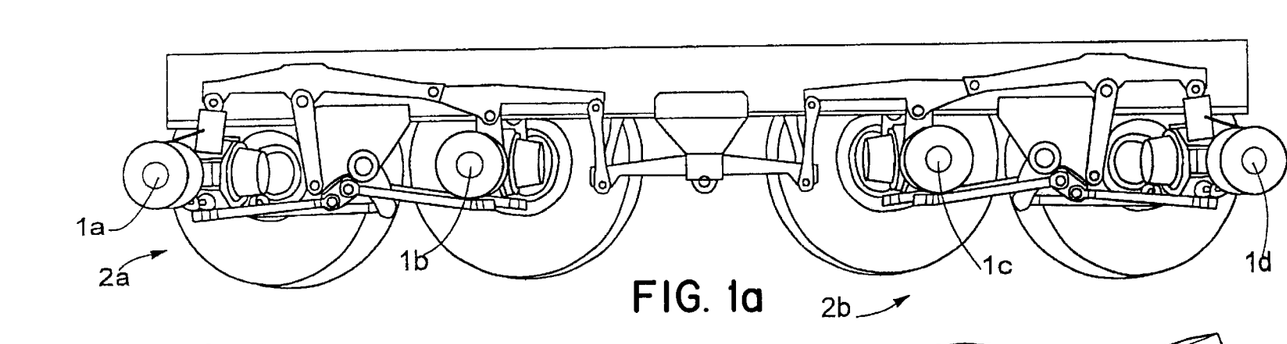
FIG. 1 is a side view of an axle construction with four axles according to the invention when a vehicle turns.

FIG. 1a is a simplified side view of an axle construction in which the bogie coupling according to the invention has been used. As can be seen, neither FIGS. 1a or 1b nor the figures to be presented below illustrate all components related to steering and other driving equipment; conventional devices related to power transmission, pressure fluid cylinders used in steering, etc. have been omitted for the sake of clarity. The figures have also been simplified in other respects to highlight the issues that are most relevant to the invention.

Figure 1B:
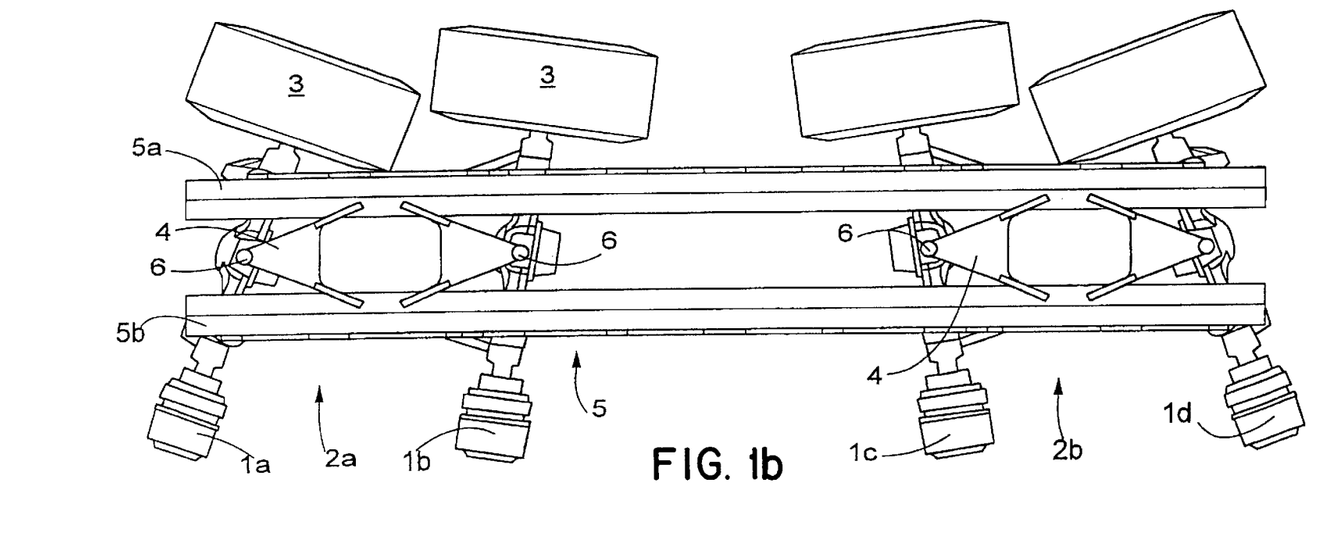
FIG. 1b is a top view of the same axles in a corresponding situation.
Figures 1C, 1D:
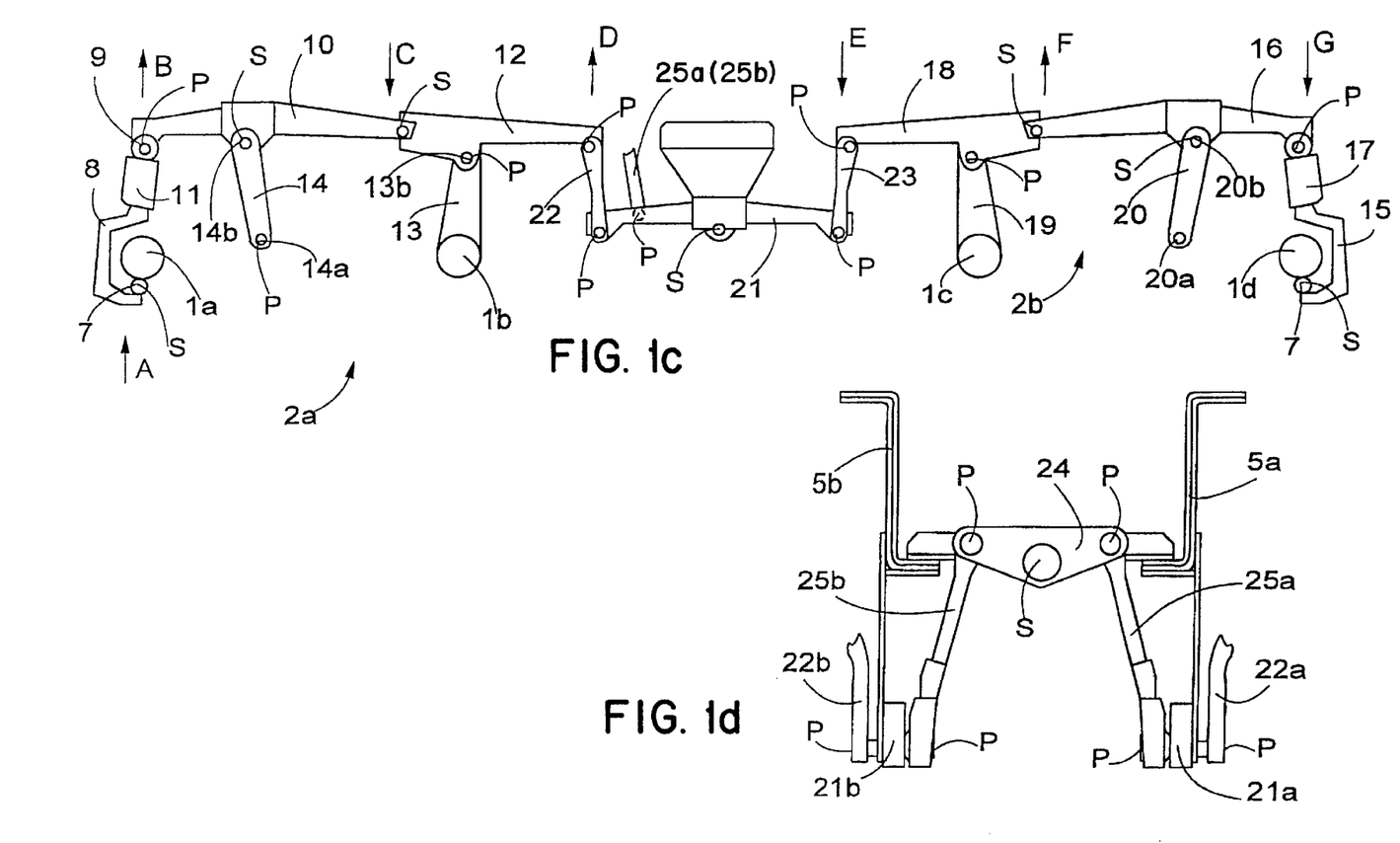
FIG. 1c is a side view of the principles of a lever mechanism according to the invention.
FIG. 1d illustrates transverse coupling connecting lever mechanisms arranged on the different sides of the frame.
Figure 1E:
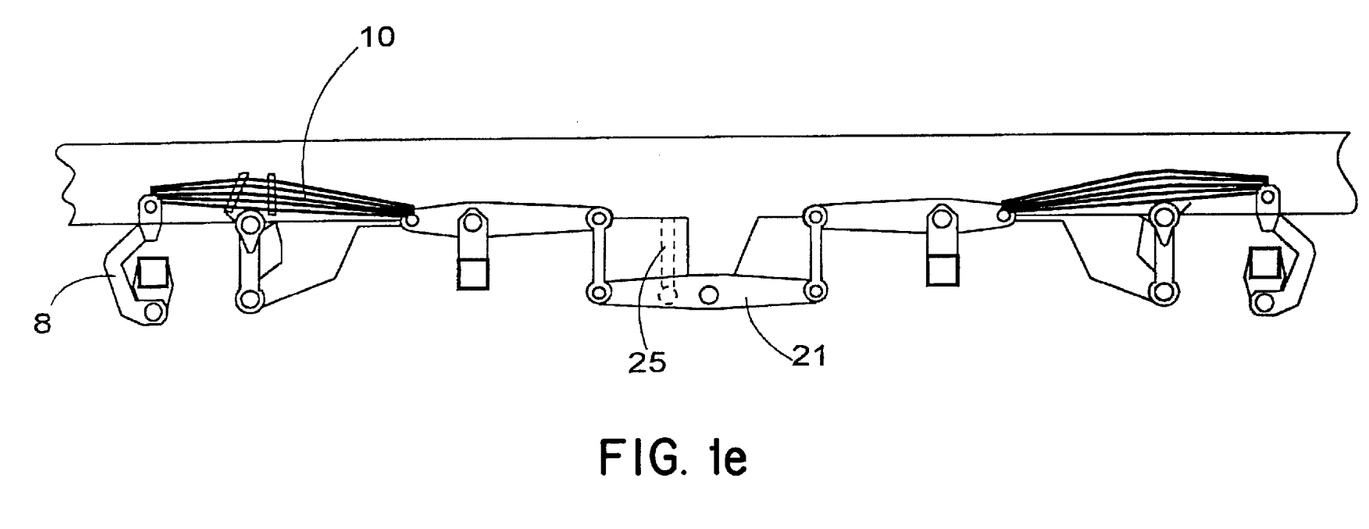
FIG. 1e is a side view of the principles of another bogie construction according to the invention, FIGS. 2a and 2b schematically illustrate a bogie coupling between axles according to the invention and its behavior in opposite steering situations.

In FIGS. 1e and 1d the joints of the lever mechanism are provided with letters showing the preferred type of the joints. Letter "P" means a ball joint which allows a motion with three degrees of freedom, and letter "S" refers to a hinge joint, i.e., a joint which enables a motion with one degree of freedom around the vertical or horizontal pivot axle of this joint.

The axle construction according to the figure comprises four axles 1a to 1d extending from the front to the rear of the vehicle, which form two bogies interconnected by means of levers, i.e., a front bogie 2a and a trailing bogie 2b. The front bogie and the trailing bogie may have substantially similar structures, which are, however, structural mirror images with respect to the longitudinal center section of the vehicle. Naturally, there may also be differences in spring stiffness and dimensions of components between the front bogie and the trailing bogie, depending on the use of the vehicle and weight distribution between the bogies, for example. The axles used are stiff, since their load-carrying capacity is good and their structure simple. For the sake of clarity, the figure illustrates the wheels 3 only on one side of the vehicle; however, instead of the single wheels shown in the figure, the wheels could be twin wheels, if the load-carrying capacity needed and the friction to be transmitted to the driving surface necessitate this.

In the solution according to the figure, each axle 1a to 1d is arranged to turn, i.e., all wheels of the vehicle are steering wheels. The axles can be turned, e.g., by means of pressure fluid cylinders or corresponding actuators which are not shown, which are arranged to use steering rods and levers needed for steering the vehicle as well as other steering members connected between the axles and the actuators.

These members are also arranged to turn the axles so that all wheels are parallel with the tangents of the turning circles drawn around the same center when the vehicle is turned. In that case the foremost axle 1a and the rearmost axle 1d have turned most in the opposite directions, and correspondingly the innermost axles have also turned in the opposite directions with respect to each other, but to a lesser extent than the outermost axles.

Each axle is secured to the vehicle frame 5 by means of a triangular support 4 shown in FIG. 1b so that free longitudinal and transverse movement of the axle with respect to the frame is prevented. The middle of the axle can also be supported by suitable longitudinal and lateral support bars.

The vehicle frame 5 preferably consists of two frame beams 5a and 5b, which are substantially parallel and spaced from each other, their cross-section mainly resembling the letter "Z". However, frame structures and profiles of other kinds can also be used, if necessary. The triangular support 4 is pivoted between the frame beams in a manner allowing the axle to move in the up and down direction with respect to the frame, the axle being controlled by the lever mechanism belonging to the bogie construction. Furthermore, at the end of the triangular support nearest the axle there is a joint 6, which is connected to the middle of the axle, and thus the joint allows the axle to be turned in the horizontal direction about a vertical axis of the joint. The joint 6 also allows the stiff axle to swing with respect to this joint in the longitudinal direction of the frame when there is a height difference between the wheels at the different ends of the axle because of an uneven driving surface, etc.

The axle construction comprises a suspension arrangement which consists of joints, suspension rods, rocking levers and springs and was illustrated in a simplified form in FIG. 1c. A corresponding lever mechanism is arranged on both sides of the frame, preferably outside it. The foremost axles, i.e., the first axle 1a and the second axle 1b, are interconnected, and correspondingly the rearmost axles, i.e., the third axle 1c and the fourth axle 1d, are interconnected mechanically so that the axles form two bogies 2a and 2b consisting of two steerable sprung axles. These bogies are interconnected by an equalizer lever 21 extending parallel with the longitudinal direction of the vehicle. In addition, the lever mechanisms on the different sides of the vehicle are interconnected by a transverse equalizer lever 24, which will be described below.

A curved C-shaped first suspension rod 8 is pivoted below the first axle 1a, i.e., a joint 7 engages a portion of the first axle 1a facing the ground surface. The first suspension rod is connected to a first longitudinal rocking lever 10 by a joint 9. There may be a first spring member 11, which is preferably a set of springs consisting of a stack of disc-shaped springs, mounted between the rocking lever 10 and the first suspension rod 8. The structure may be also formed without the above-mentioned spring member, if, e.g., flexibility of the rocking levers brings about the necessary spring effect. Spring members are not necessarily needed at all in vehicles intended for low driving speeds.

Between the first suspension rod 8 and the rocking lever 10, the joint 9 enables turning of the axle and movements of the axle in the up and down direction. Alternatively, the joint 7 may be a joint which enables steering of the axle 1a. Thus the front end of the first rocking lever 10 is connected to the upper end of a spring member 17 mounted onto the first suspension rod 8 by a suitable joint 9. The other end of the lever 10 is correspondingly connected to another longitudinal rocking lever 12, which is pivoted on a first ear 13 mounted fixably to the upper surface of the second axle 1b. In other words, the first rocking lever 10 is pivoted on the lower surface of the first axle 1a and on the upper surface of the second axle 1b through the second rocking lever 12 and ear 13. The first rocking lever 10 is also pivoted on the frame between its ends by means of a first supporting bar 14 pivoted turnably on the frame by a universal joint 14a. Furthermore, between the supporting bar 14 and the first rocking lever 10 there is a horizontal pivot joint 14b which together with the joint 14a maintains the ends of the rocking lever 10 substantially at the same height when the rocking lever moves in the longitudinal direction of the vehicle during steering of the axles. The supporting bar 14 is preferably made long enough so that the vertical displacement of the rocking lever caused by the horizontal displacement of the upper end of the supporting bar is as small as possible. Instead of using the turning supporting bar 14, the pivot of the rocking lever may be moved in the longitudinal direction of the vehicle by means of a suitable slide mechanism. The first rocking lever 10 is preferably a parabolic spring, a set of leaf springs or a corresponding spring member which receives loads and at the same time transmits part of the loads directed to the axle to other axles. The second rocking lever 12 may also be a spring member of this kind, but it is clear that both of the first and the second rocking levers may constitute fixed, substantially inflexible levers, in which case the forces can be received by separate spring members. The solution preferably distributes loads evenly between different axles of each bogie and between the interconnected bogies. Consequently, a single axle, spring or supporting structure of axles does not need to be as massive as would be the case if each axle were sprung and secured to the frame separately without the coupling according to the invention. The function and behavior of the bogie coupling of the invention and the levers connecting the bogies in different driving situations will be described better in connection with FIGS. 6a to 6c and FIG. 7.

As can be seen in FIGS. 1a to 1c, the levers of the front and trailing bogies 2a, 2b are substantially similar. Thus, a fourth suspension rod 15, which is C-shaped, is pivoted on the fourth axle in the same manner as the first suspension rod is pivoted on the front bogie. There may also be another spring member 17 disposed between the suspension rod 15 and a fourth longitudinal rocking lever 16. The end of the fourth rocking lever 16 closest to the front bogie is pivoted on a third longitudinal rocking lever 18, which is secured onto the upper surface of the third axle 1c by means of a third supporting bar 19. The fourth rocking lever 16 is secured to the frame by means of a fourth supporting bar 20, which is pivoted so that it turns with respect to the frame according to suspension and steering.

An equalizer lever 21 which extends longitudinally with respect to the frame is mounted between the front bogie 2a and the trailing bogie 2b. The lever is turnable about a horizontal pivot on the frame or on an ear mounted in the frame for the lever. This equalizer lever transmits a portion of the loads directed to the front bogie to the trailing bogie and vice versa. The end of the second rocking lever 12 of the front bogie closest to the trailing bogie is connected to one end of a suspension rod 22, whose other end is pivoted on the equalizer lever 21. The third rocking lever 18 is connected to a third suspension rod 23 in a similar manner, the lower end of the third suspension rod being connected to the other end of the equalizer lever 21. The above-mentioned arrangement could be replaced by the use of pressure fluid cylinders instead of the suspension rods 22 and 23 and by interconnecting them so that as the loads retract the piston rod of the first cylinder, the piston rod of the second cylinder is extended in the same or different ratio. Thus no equalizer lever 21 would be needed. This solution is advantageous, e.g., when there is no room for an equalizer lever. Furthermore, the cylinders provide good controllability and absorb movements, and thus they can be used for influencing the maneuverability of the vehicle in various ways.

FIG. 1d illustrates how the lever mechanisms on different sides of the frame are interconnected by an equalizer lever 24. This coupling should act particularly when the bogies tilt in different directions with respect to the longitudinal axis of the vehicle, i.e., when there is oscillation between the bogies. This structure enabling oscillation between the bogies is advantageous, e.g., when one drives on a road whose degree of inclination varies. Furthermore, the transverse coupling prevents the vehicle from jerking under hard braking and acceleration. The transverse coupling is preferably implemented by the transverse equalizer lever 24 mounted between the frame beams 5a, 5b and by bars 25a, 25b mounted between the ends of the transverse equalizer lever and the longitudinal equalizer levers 21a, 21b of both lever mechanisms. The bars transmit the force directed to the lever mechanism on the first side of the vehicle to the lever mechanism on the other side and vice versa. The transverse equalizer lever and the bars connected to it could be replaced by other coupling means, such as pressure fluid cylinders. The cylinders can be connected directly to longitudinal equalizer levers by means of a suitable joint and arranged to function so that when one piston rod retracts, the other one extends. If necessary, the cylinders could also be used for absorbing the movements.

FIG. 1e is a side view of another embodiment of the axle construction according to the invention. In principle, the structure of the axle assembly is similar to the structures illustrated in the previous figures. Here the rocking lever 10 is a set of individual springs, which is secured to the upper end of the first suspension rod 8 without utilizing an intervening spring member 11. The bar 25 driving the transverse equalizer lever, which connects the longitudinal equalizer levers 21, is denoted by a broken line in the figure.

The lever mechanism illustrated in FIGS. 1a to 1e can be modified in several ways. It is also possible to influence the function of the lever mechanism by changing the dimensions of its different components, e.g., by changing the dimensions of the rocking levers and equalizer levers and the position of the joints. If necessary, the desired parts of the lever mechanism may also be provided with suitable shock absorbers or the like.

Figure 2A:
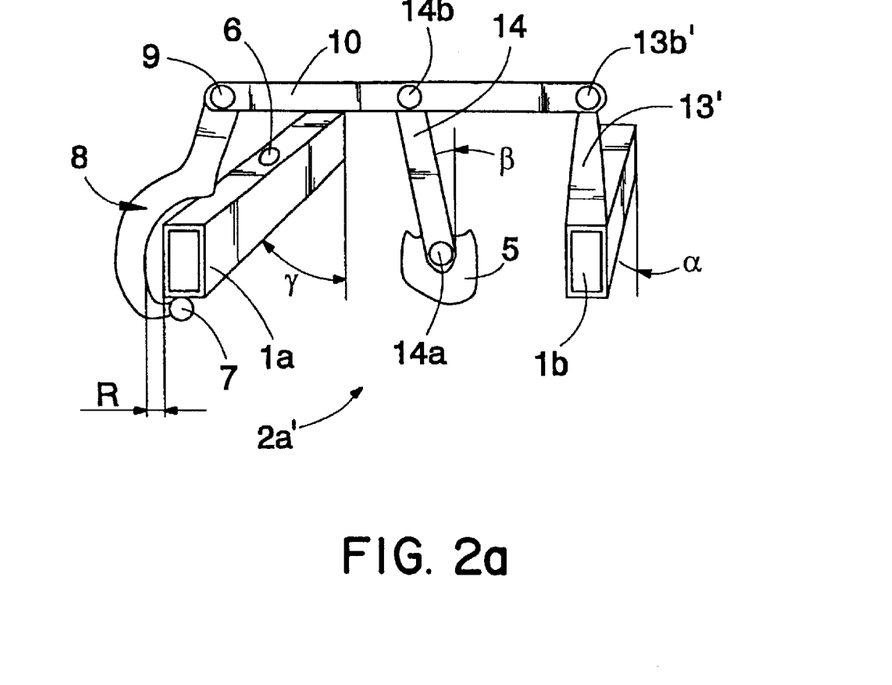

FIG. 2a is a highly simplified schematic side view of a structure of a bogie coupling 2a' according to the invention. The bogie 2a' comprises two steerable axles, both of which are pivoted in their middle by means of a joint 6 mounted onto a triangular support or a similar member so that the axles can be turned about this joint when the vehicle is steered. Furthermore, the stiff axle may swing with respect to this joint in the longitudinal direction of the vehicle in the manner required by the driving surface, i.e., the wheels at the different ends of the axle may be at different heights. As can be seen, the first axle 1a, which is farther out than the second axle 1b, has turned along a larger turning angle 1b. Thus the turning angle y of the first axle 1a is larger than the turning angle α of the second axle 1b. The axles 1a and 1b are combined into a bogie 2a' by means of the first rocking lever 10 so that the first axle is connected to the first end of the rocking lever 10 by the first suspension rod 8. The other end of the rocking lever is connected to the second axle 1b by means of an ear 13', which extends upwards from the axle. The axle to which the rocking lever is connected by only one joint (i.e., the second axle 1b in this case) determines the longitudinal displacement of the rocking lever during steering movements. Clearly it is preferable to choose the axle of the bogie that turns the lesser angle, to constitute the axle determining the extent of the longitudinal movement of the rocking lever, so that the movements of the levers are as small as possible. The rocking lever is pivoted between its ends, preferably in the middle, by a joint 14b at the upper end of the supporting bar 14, and the rocking lever may swing around this joint due to the possible height difference between the bogie axles, e.g., when one drives on an uneven surface. The lower end of the supporting bar 14 is pivoted on the frame 5 by a joint 14a, and thus the supporting bar may turn with respect to this joint 14a as a result of steering movements. In other words, the rocking lever is pivoted so that it can move in its longitudinal direction as a result of steering movements. Steering movements do not substantially change the height of the vehicle frame, particularly when the supporting bar 14 is relatively long and tilts slightly. In that case, a change in the frame height is insignificant compared to prior art solutions.

Figure 2B:
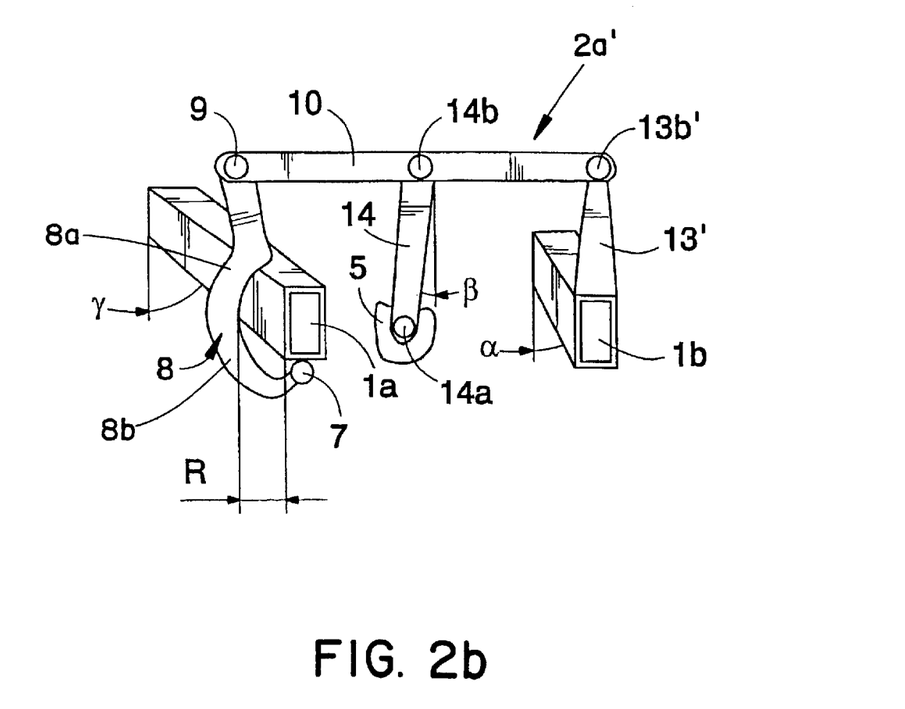

Displacement of the rocking lever 10 and thus the turning angle β of the supporting bar 14 are determined by the turning angle α of the second axle. It should also be noted that on the other side of the frame, i.e., on the side of the inner curve, the rocking lever moves in the opposite direction. Since the turning angles α and γ of the axles are of different sizes, the levers must allow a change in the distance between the ends of the axles. This can be easily seen by comparing the situations illustrated in FIGS. 2a and 2b: in FIG. 2a the distance between the closest ends of the axles 1a and 1b is longer than in the situation of FIG. 2b. This could be implemented by using a straight suspension rod pivoted on the upper surface of the first axle, but in that case the suspension rod would tilt unfavorably in the extreme positions of steering, which causes considerable horizontal forces. Instead, by using a suspension rod 8 which is pivoted below the axle 1a, the suspension rod can be made longer, i.e, the distance between the joint 9 at the first end of the rocking lever 10 and the joint 7 below the axle 1a is as long as possible. At the same time, however, the lever mechanism is at a low elevation, which facilitates the designing of the vehicle structure. The above-described curved suspension rod 8 with the shape of a letter C or a sickle can rotate relative to the axle and thus, an intermediate portion 8a of the suspension rod 8 can move away from the axle as the rocking lever moves in its longitudinal direction. For this reason the suspension rod is formed by providing a sufficiently large space R between a curved section 8b of the rod 8 and the axle 1a so that there is always room for the suspension rod to tilt enough. As can be seen in the figures, this space R is largest in one of the extreme positions of steering and smallest in the opposite position of steering.

Figure 3:
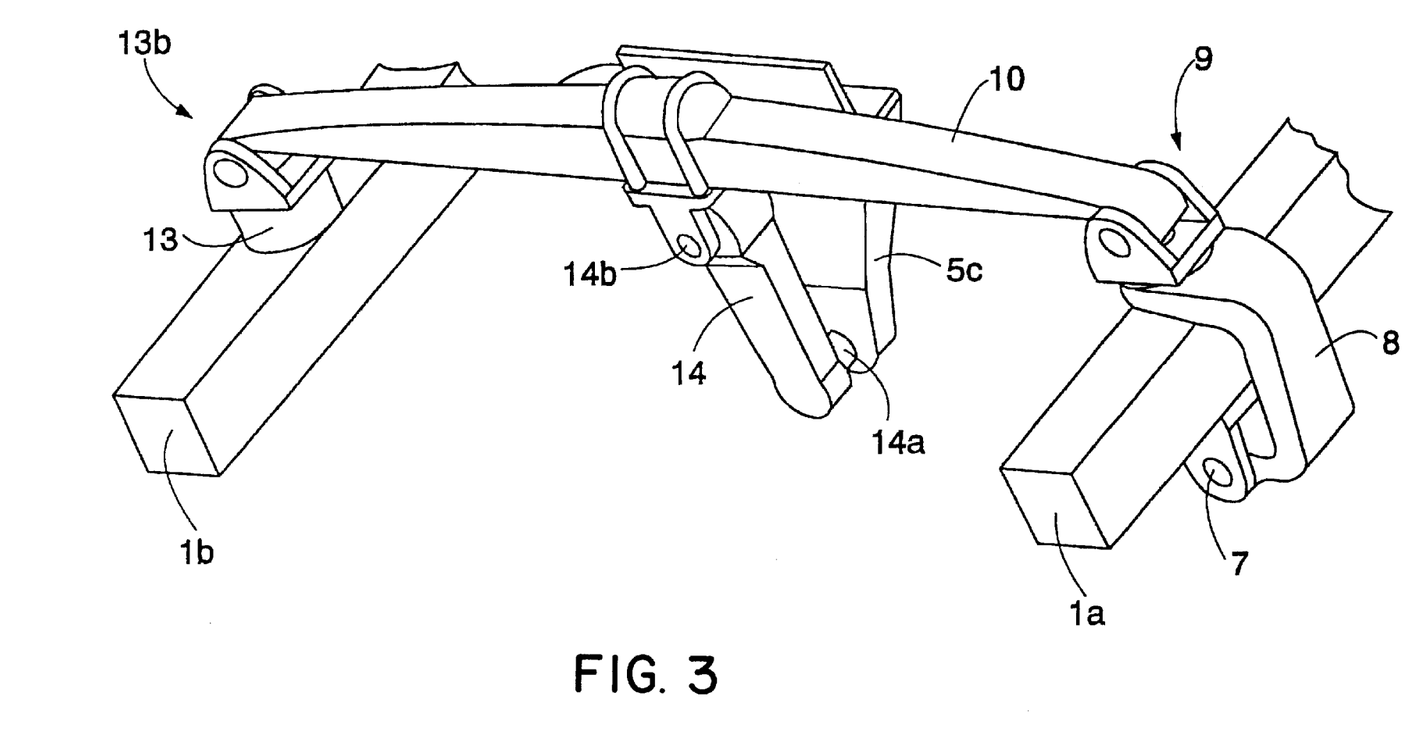
FIG. 3 is a schematic perspective view of a bogie construction consisting of two axles according to the invention.

FIG. 3 is a perspective view of a bogie coupling between two successive stiff axles according to the invention. A first curved suspension rod 8, preferably C-shaped, is pivoted on the lower surface of the first axle 1a by a joint allowing one degree of freedom. The upper end of the suspension rod is pivoted on the first end of the first rocking lever 10 by a joint 9 allowing turning with two degrees of freedom. The joint 7 can also be provided with a turn with two degrees of freedom, in which case the joint 9 may be a joint with only one degree of freedom. However, it should be ensured that the axle has enough room to turn with respect to the suspension rod. It is essential that the joints 7 and 9 allow the suspension rod to tilt as the rocking lever moves in its longitudinal direction and that at least one of the joints allows the axle to turn with respect to the rocking lever, which substantially remains parallel with the vehicle frame. The other end of the rocking lever 10 is pivoted on the ear 13 mounted onto the upper surface of the second axle 1b by a joint 13b. The joint 13b has to allow the axle to move in the vertical direction and thus allow the rocking lever to swing. The joint 13b should also allow the second axle 1b to turn with respect to the rocking lever. The rocking lever 10 is pivoted between its ends on a first supporting bar 14 by a joint 14b so that the rocking lever can tilt with respect to the horizontal axis of this joint as a result of the longitudinal movements of the axle. The lower end of the supporting bar 14 is pivoted on an ear 5c or the like, provided from the frame, by a joint 14a. Since the rocking lever is pivoted on the frame through two joints 14a and 14b, it can move in the longitudinal direction of the vehicle during steering, so that the height of the ends does not change substantially and loads are not directed to the structures.

Figure 4:
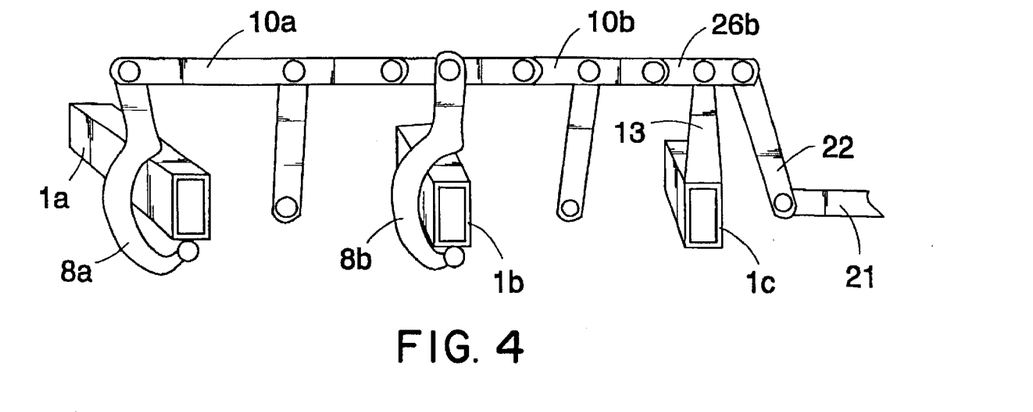
FIG. 4 is a schematic side view of a three-axle bogie according to the invention, FIGS. 5a and 5b schematically illustrate different ways, respectively, of pivoting a suspension rod.

FIG. 4 is a simplified side view of a bogie construction consisting of three stiff and steerable axles. The construction comprises two rocking levers 10a and 10b which are arranged to move in their longitudinal direction as a result of steering movements. The magnitude of displacement of the rocking levers caused by a steering movement is determined preferably by the innermost axle in the bogie, i.e., the axle 1c that turns least, one end of the inner rocking lever 10b being pivoted on this axle by means of a second intermediate lever 26b and an ear 13. Between the outer rocking lever 10a and the inner rocking lever 10b there is a first intermediate lever 26a, which is pivoted on the upper end of a second suspension rod 8b between its ends. The two outermost axles 1a and 1b are connected to the lever mechanism of the bogie by a C-shaped suspension rod 8a and 8b which is pivoted below the axles. The suspension rod allows the first axle to turn most, i.e., its turning angle is the largest, and the second axle to turn more than the third axle. Furthermore, one end of the intermediate lever 26b pivoted on the ear 13 of the third axle 1c is connected to an equalizer lever 21, extending parallel with the longitudinal direction of the vehicle, by a suspension rod 22. The equalizer lever is mounted between the bogie in question and the following bogie, and it distributes loads evenly between those bogies. The first rocking lever 10a, the first intermediate lever 26a, the second rocking lever 10b and the second intermediate lever 26b are arranged to move substantially only in the horizontal direction and an equal distance required by the turning angle of the axle 1c.

Figures 5A, 5B:
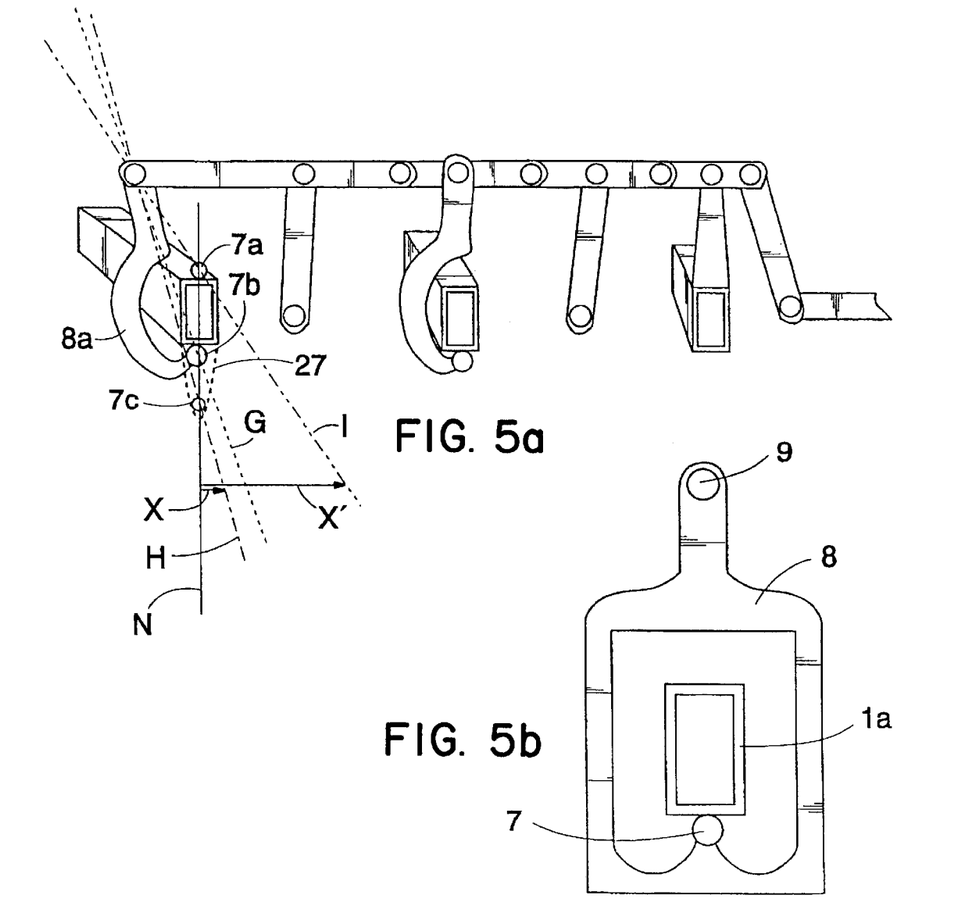

FIG. 5a illustrates a three-axle bogie assembly according to the previous figure. The line formed by colons and dashes shows an inclination of the first suspension rod if the suspension rod were pivoted on the upper surface of the first axle about a joint 7a. The broken line shows an inclination of the C-shaped suspension rod 8a pivoted on the lower surface of the axle about a joint 7b, and the line formed by dots and dashes shows an inclination of a C-shaped suspension rod (not shown) which would be pivoted about a joint 7c of an ear 27 (shown with a broken line), which would be mounted onto the lower surface of the first axle and extend downwards. In the last-mentioned case, the inclination of the suspension rod 8a is the smallest, and thus the proportional horizontal force component X directed to the lever mechanism is smaller than in the two other cases, particularly compared to the second proportional force component X' caused when the suspension rod is fixed above the axle. When pivoting occurs below the axle, the force created by the movement does not direct a great horizontal force to the lever mechanism, and thus the steering levers and actuators can be of lighter construction than usually permitted. Consequently, it is possible to influence the inclination angles of the suspension rods by providing the lower surface of the axles with ears 27 which are of the desired length, which extend downwards and on which the lower ends of the suspension rods are pivoted. In a preferred embodiment this is implemented as follows: the more the ear extends downwards, the further away the axle is from the bogie axle 1c that turns least (and also determines the longitudinal displacement of the lever mechanism as a result of a steering movement). The length of the ears can be selected so that the inclination angle of the suspension rods is substantially constant regardless of the axle, and thus the loads directed to the suspension rods are constant with respect to the inclination. In that case, suspension rods with standard dimensioning can be used.

FIG. 5b illustrates another solution which allows the suspension rod 8 to be pivoted below the axle. In this solution a kind of frame is arranged around the axle, which is pivoted on the axle. Pivoting below the axle and the shape of the suspension rod could be implemented in other ways.

Figure 6A:
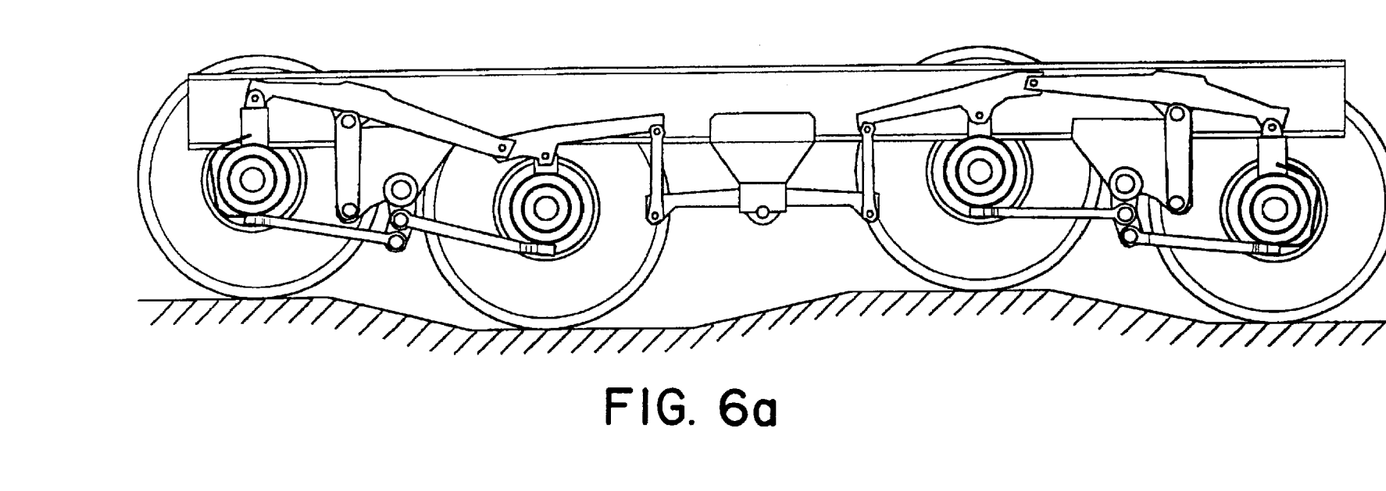
FIGS. 6a to 6c are schematic side views illustrating how an axle construction consisting of two bogies with two axles behaves on different driving surfaces.

FIG. 6a illustrates how an axle construction consisting of four axles and two interconnected bogies according to the invention behaves on a varying road surface. The wheels of the axle construction are pressed firmly even against an uneven road surface, and the lever mechanism receives the loads and distributes them evenly between the axles and the bogies.

Figure 6B:
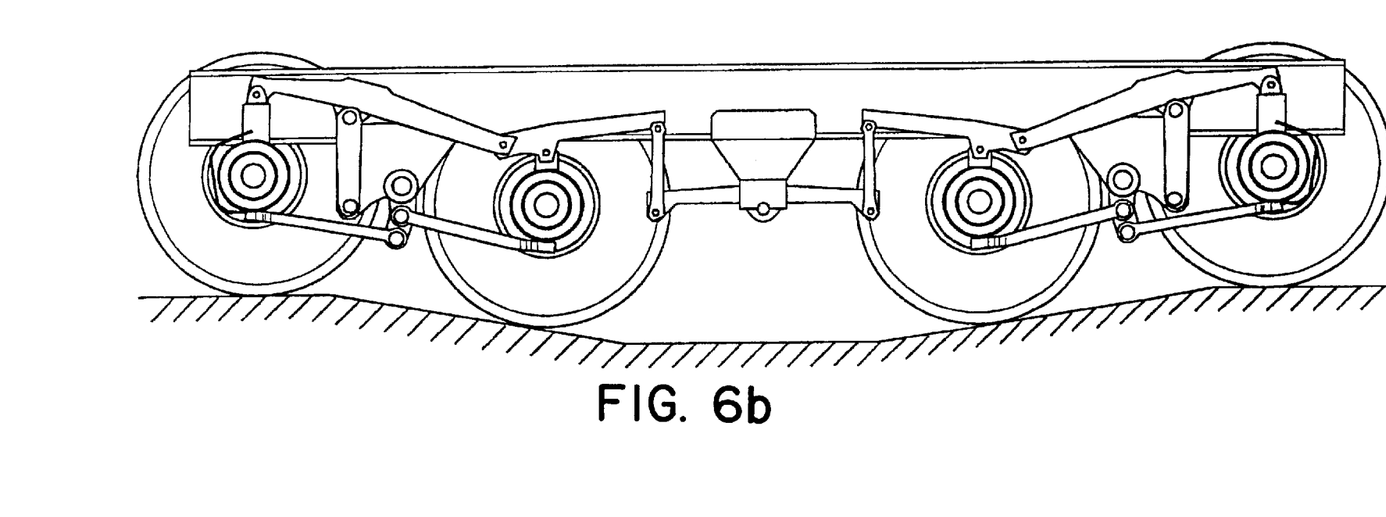

FIG. 6b illustrates a situation in which a vehicle provided with an axle construction according to the previous figure is in a depression. As can be seen, the movement, i.e., vertical movement, of the axles does not cause the rocking levers to move in the longitudinal direction, i.e., they only tilt by pivoting at their ends.

Figure 6C:
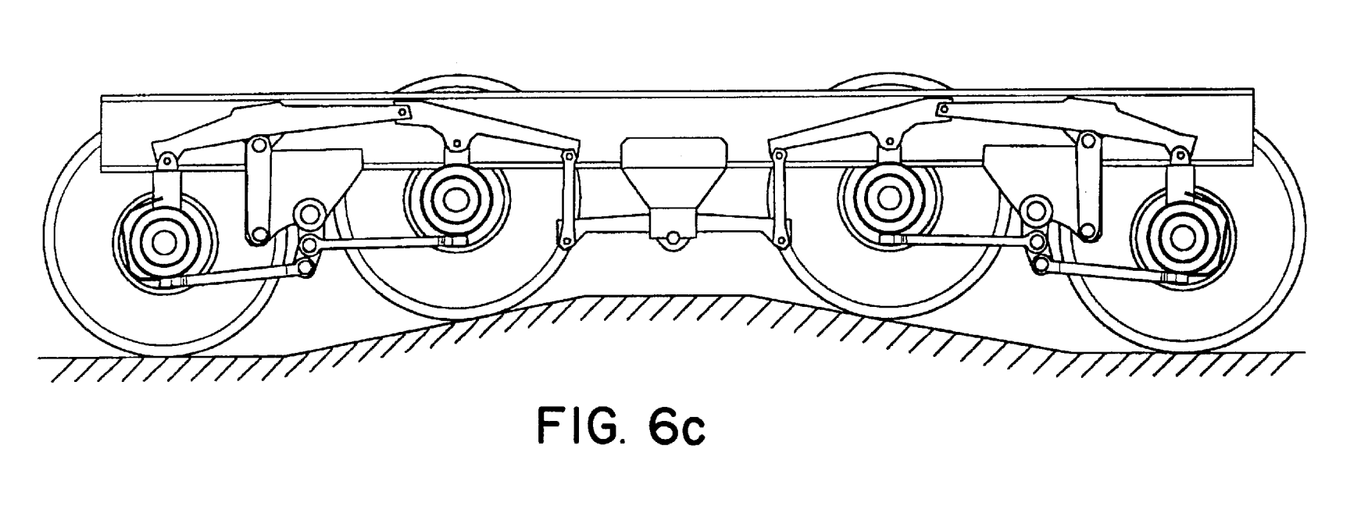

FIG. 6c shows how the axle construction according to the invention behaves when the vehicle is on a mound, i.e., the situation is opposite to the situation illustrated in FIG. 6b. As it can be seen in FIGS. 6a to 6c, the lever mechanism does not take much room above the axles even though movements of the axles are considerable in the driving situations shown.

Figure 7:
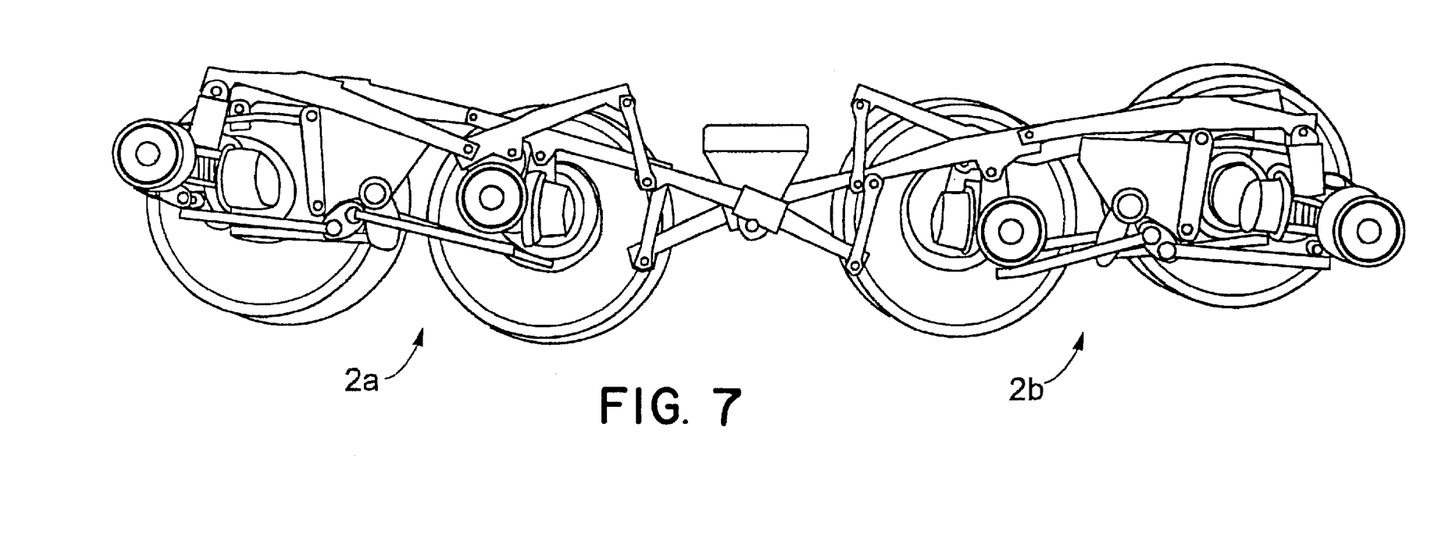
FIG. 7 illustrates how an axle construction according to the invention behaves when there is oscillation between its successive bogies, and FIGS. 8a to 8d schematically illustrate two different four-axle vehicles comprising a three-axle bogie construction according to the invention.

FIG. 7 is a side view illustrating how the axle construction behaves in oscillation. As can be seen, the bogies 2a and 2b have turned in the opposite directions with respect to the longitudinal axis of the vehicle. The longitudinal equalizer levers on the different sides of the vehicle have thus also turned in the opposite directions. The figure does not show the transverse coupling between the lever mechanisms.

Figure 8A:
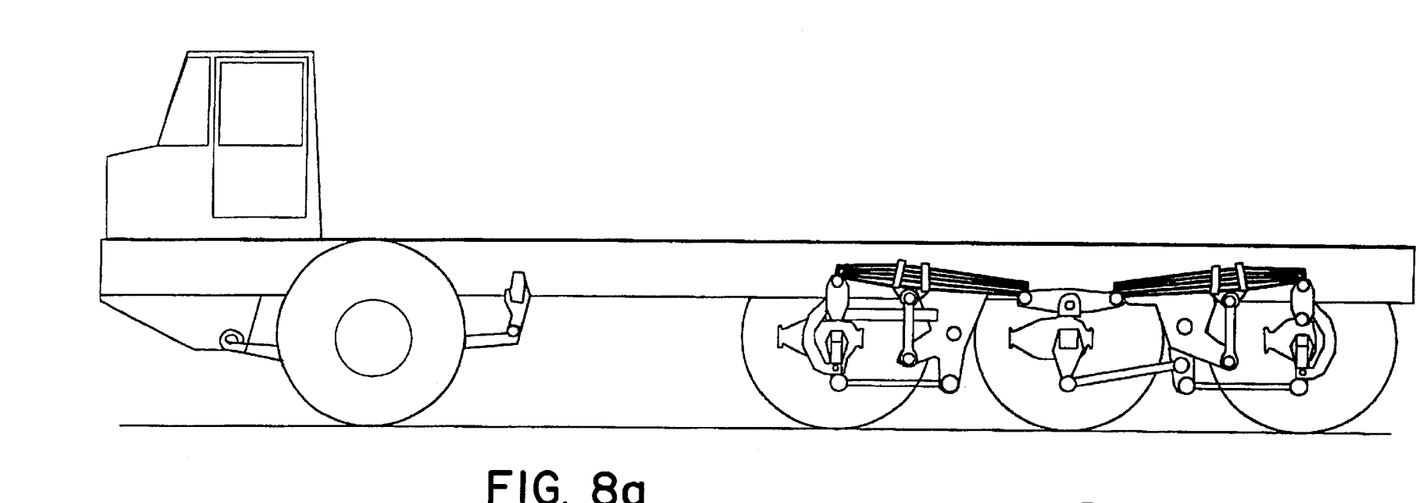
Figure 8B:
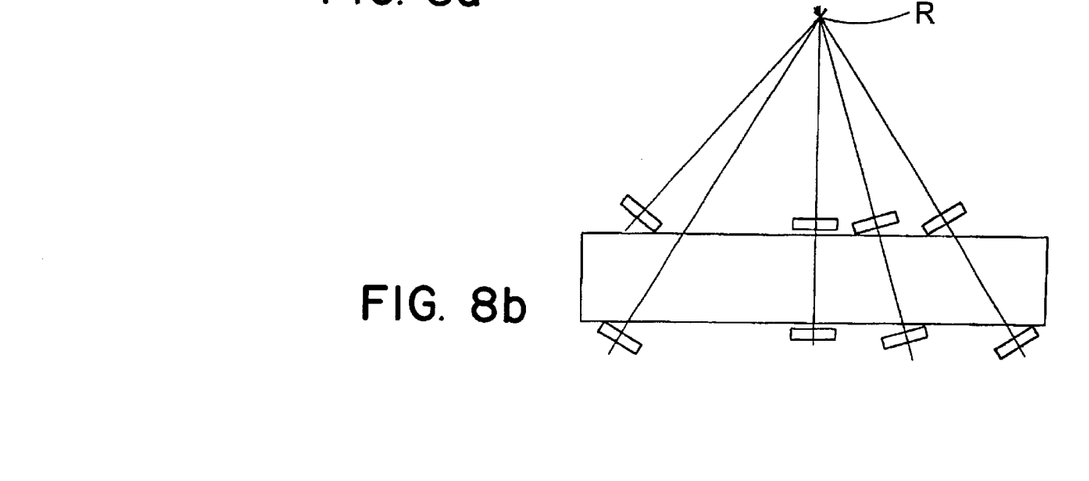
Figure 8C:
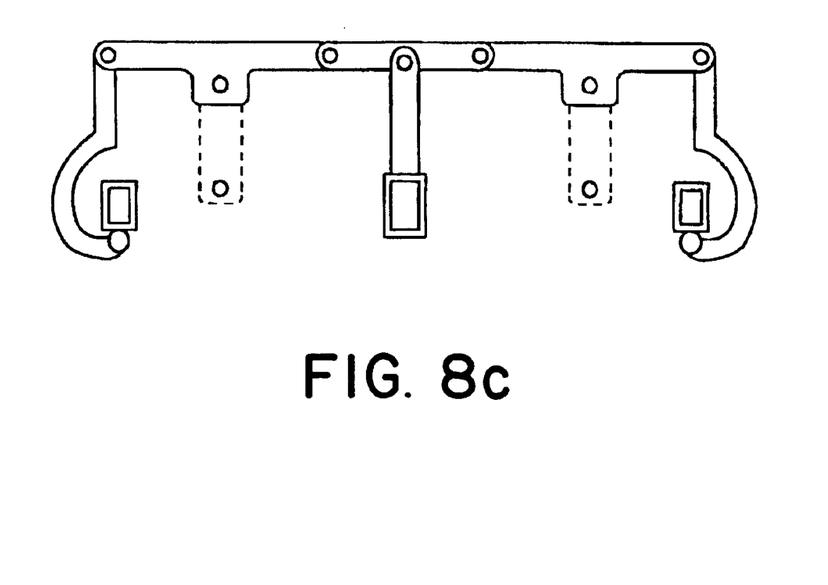
Figure 8D:
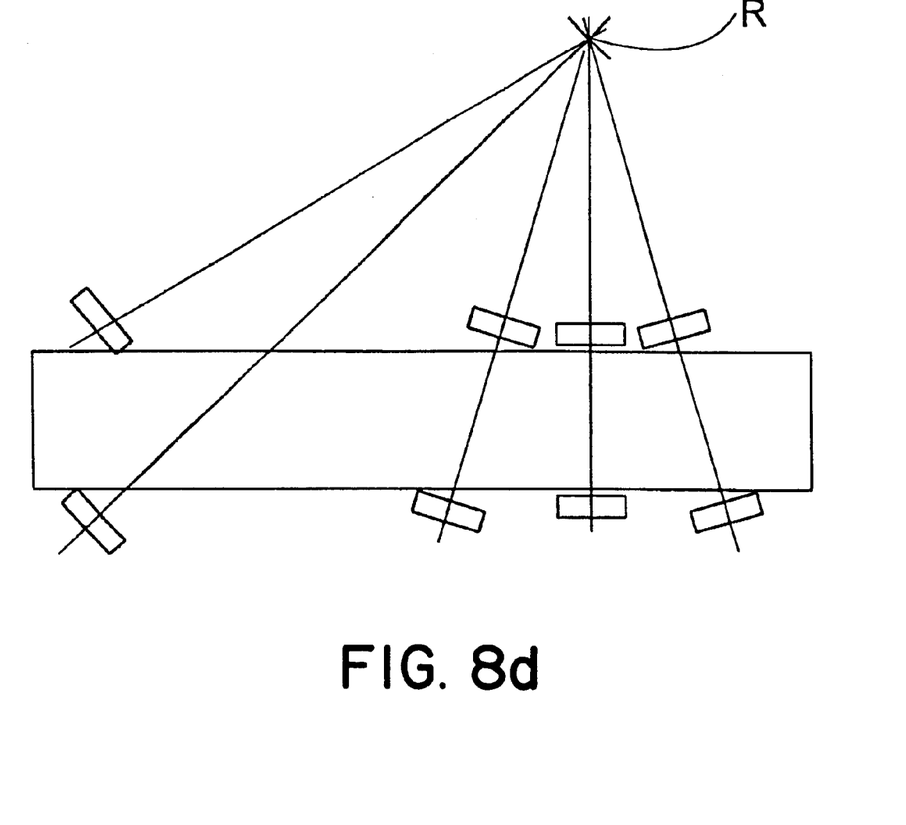

FIG. 8a is a side view of a four-axle vehicle in which three stiff axles are combined into a bogie by means of the bogie coupling according to the invention. The wheels on the first axle of the vehicle are turned e.g., around the pivot bolts at the ends of the axle. However, a stiff front axle could be used. All turnable wheels of the vehicle are arranged to turn with respect to the same turning point R, as is illustrated in FIG. 8b. It also appears from the figure that the foremost axle of the three-axle bogie cannot be turned, whereas the two last axles are turnable. The construction comprises two longitudinal rocking levers between which there is an equalizer lever turnably pivoted on the middle axle. There is preferably a joint between the equalizer lever and the rocking levers, which allows sliding contact in the horizontal direction, and thus the equalizer lever and the rocking levers can swing. Both longitudinal rocking levers are arranged to move in their longitudinal direction as required by steering. Furthermore, to compensate for different turning angles the outermost ends of the rocking levers are provided with suspension rods pivoted below the outermost axles. In the solutions shown in FIGS. 8c and 8d the stiff middle axle of the bogie cannot be turned, whereas the two outer axles are turnable. In this solution it is not necessary to arrange the rocking levers so that they move in the longitudinal direction of the vehicle, but they can be pivoted directly on the frame. If desired, the rocking levers can naturally be pivoted using turning supporting bars, as is shown with broken lines in the figure.

The drawings and the description related to them are only intended to illustrate the inventive concept. The details of the invention may vary within the scope of the claims. Even though the specification and figures describe the invention mainly in connection with turnable axles, the invention can naturally be applied to axles which cannot be turned. In this case steering may be implemented e.g., by means of frame steering or steering based on a pivot pin, where the wheels are arranged to turn with respect to the axle. The rocking levers need not be arranged so that they can move in the longitudinal direction, but they can be pivoted directly e.g., on the frame. Furthermore, the axles of the front bogie may be turnable, while the axles of the trailing bogie cannot be turned. It is also possible to combine both ends of the stiff axles of a two-axle vehicle into a bogie by a rocking lever according to the invention and arrange them to turn in the opposite directions with respect to each other by a turning angle of the same or different sizes. In addition, the change in distance resulting from different turning angles of steerable stiff axles can be implemented e.g., with a rocking lever whose both ends are telescopic, the lever allowing to increase and decrease the distance. This solution requires that the pivoting point of the rocking lever should be changed so that the lever arms of the rocking lever can maintain the desired distance ratio regardless of the change in the length of the rocking lever. Alternatively, it is necessary to arrange suitable force compensation to balance the problems caused by changing lever arms. In addition, the degrees of freedom of the joints in the lever mechanism can be changed, if necessary.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A vehicle comprising a frame and a bogie apparatus connected to the frame, the frame defining a longitudinal direction of the vehicle, the bogie apparatus comprising at least one bogie formed by at least first and second axles, each of the axles being turnable relative to the frame about a vertical pivot disposed between opposite ends of the axle, for steering the vehicle; the at least one bogie further including a lever mechanism comprising:

a rocking lever for interconnecting the first and second axles, the rocking lever being pivotable about a pivot situated between first and second ends of the rocking lever, which pivot being movable relative to the frame in the longitudinal direction of the vehicle to permit longitudinal movement of the rocking lever during steering of the vehicle; and a suspension rod having upper and lower ends, the upper end of the suspension rod being pivotably connected to the first end of the rocking lever, and the lower end of the suspension rod being pivotably connected to the first axle;

the second end of the rocking lever being pivotable with respect to the second axle;

the rocking lever arranged for movement in a direction extending substantially only longitudinally during steering of the vehicle.

2. The vehicle according to claim 1 further including a supporting lever having lower and upper ends, the lower end being pivotable relative to the frame about a horizontal transverse axis extending transversely of the longitudinal direction, the upper end being pivotably mounted to the rocking lever for pivotal movement relative thereto about a horizontal transverse axis extending transversely of the longitudinal direction, the supporting lever being rotatable about the horizontal transverse axis at its lower end during longitudinal movement of the rocking lever.

3. The vehicle according to claim 1, wherein the suspension rod is connected to the first axle at a location beneath the first axle.

4. The vehicle according to claim 3 wherein the first axle includes an ear projecting downwardly therefrom, the suspension rod being pivotably connected to the ear.

5. The vehicle according to claim 1 wherein the suspension rod is C-shaped, the lower end thereof being pivotably connected to an underside of the first axle.

6. The vehicle according to claim 1 wherein longitudinal movement of the rocking lever during steering is caused by one of the axles having a smallest turning angle.

7. The vehicle according to claim 1 wherein the at least one bogie comprises two bogies, a longitudinal equalizer lever interconnecting the bogies and being pivotable relative to both of the bogies about respective axes extending transversely relative to the longitudinal direction.

8. The vehicle according to claim 7 wherein the lever mechanism constitutes a first lever mechanism, the bogie comprising a second lever mechanism substantially identical to the first lever mechanism and spaced transversely therefrom, the first and second lever mechanisms being interconnected by a transverse equalizer lever.

9. The vehicle according to claim 7 wherein the lever mechanism constitutes a first lever mechanism, the bogie comprising a second lever mechanism substantially identical to the first lever mechanism and spaced transversely therefrom, the first and second lever mechanisms being interconnected by a transverse equalizer lever, the transverse equalizer lever interconnecting the longitudinal equalizer levers of the respective lever mechanisms.

* * * * *